July 25, 1961 W. WIEBE 2,993,322
FRUIT HARVESTER FOR PICKING UP FRUIT OFF THE GROUND
Filed Aug. 27, 1959 4 Sheets-Sheet 1
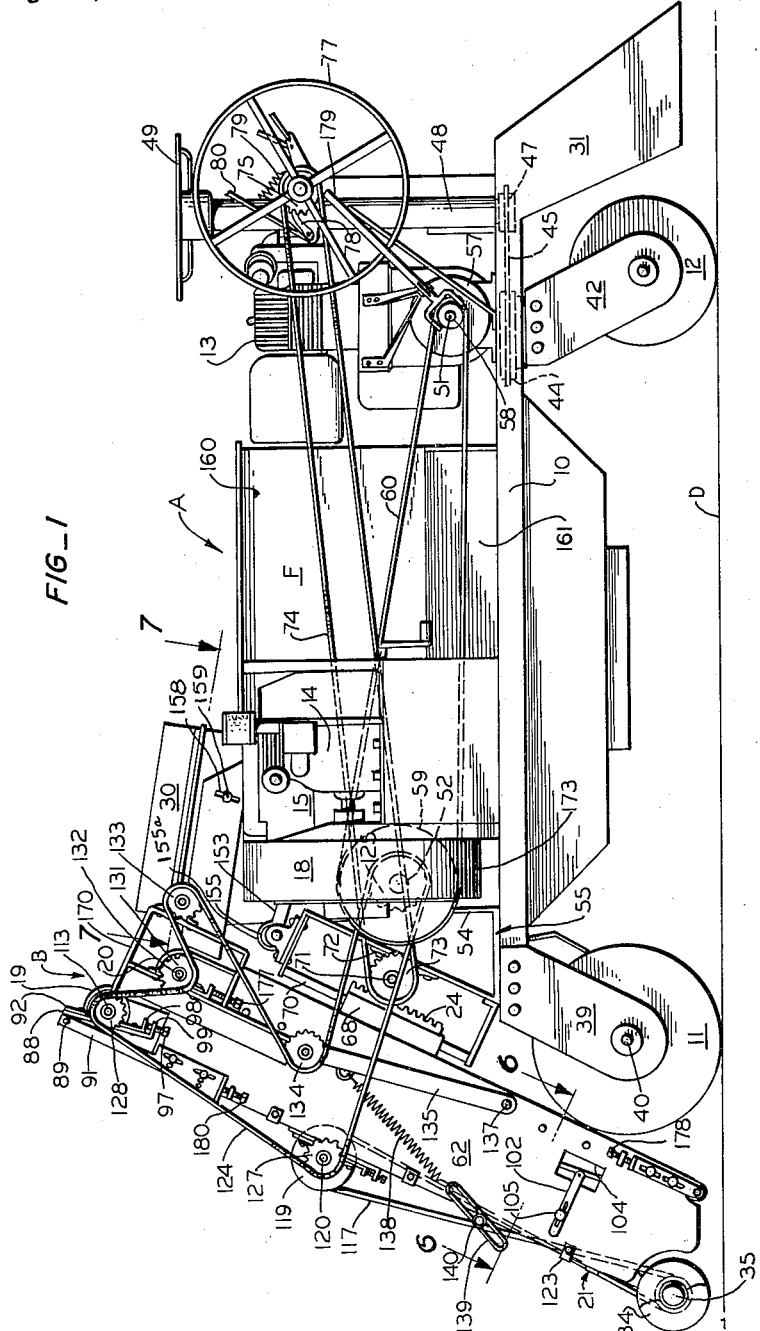
INVENTOR.
WALTER WIEBE
BY
Hansen and Lane
ATTORNEYS July 25, 1961 W. WIEBE 2,993,322
FRUIT HARVESTER FOR PICKING UP FRUIT OFF THE GROUND
Filed Aug. 27, 1959 4 Sheets-Sheet 2
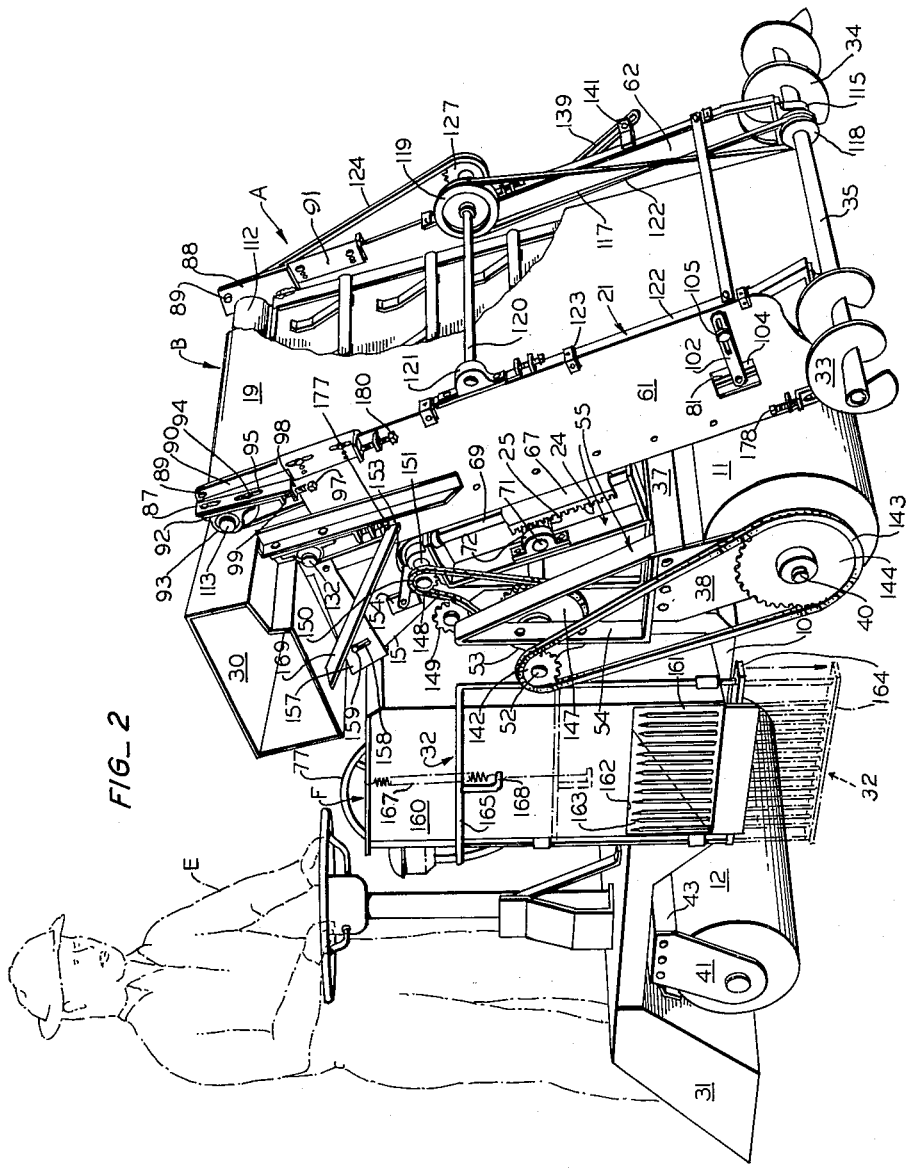
FIG_2
INVENTOR.
WALTER WIEBE
BY
ATTORNEYS

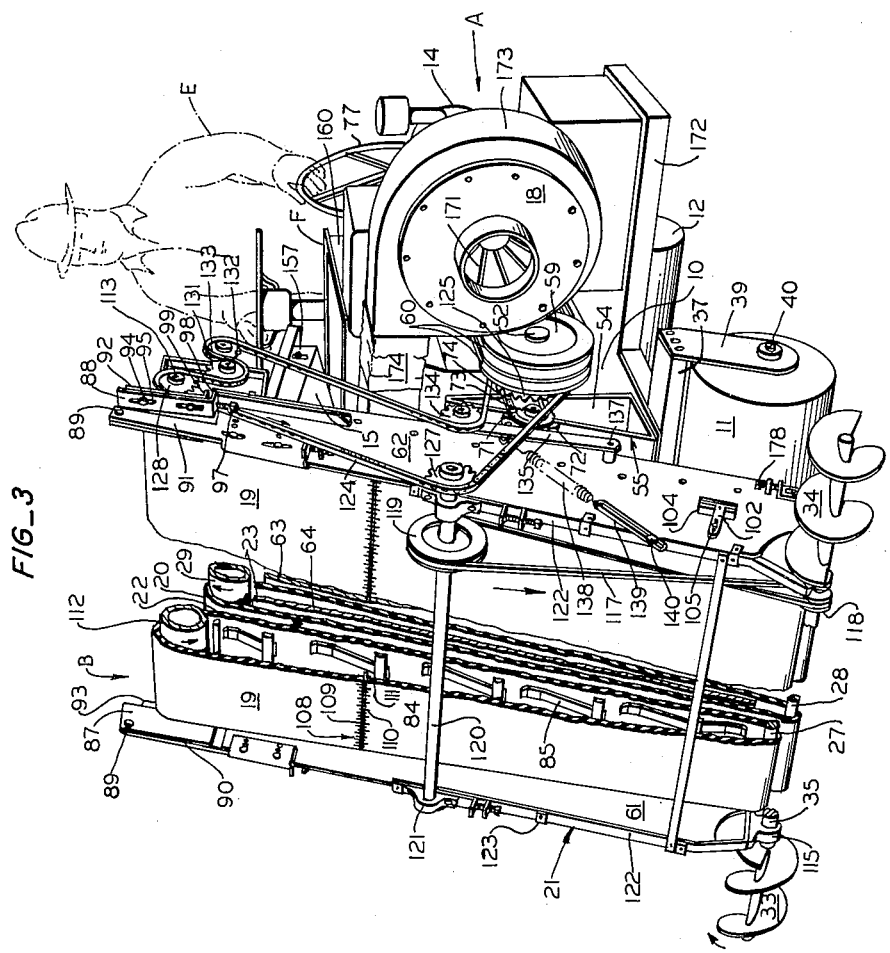

July 25, 1961 W. WIEBE 2,993,322
FRUIT HARVESTER FOR PICKING UP FRUIT OFF THE GROUND
Filed Aug. 27, 1959 4 Sheets-Sheet 4
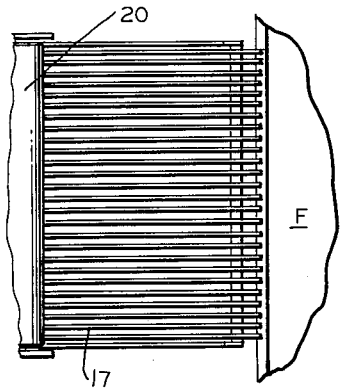
FIG_7
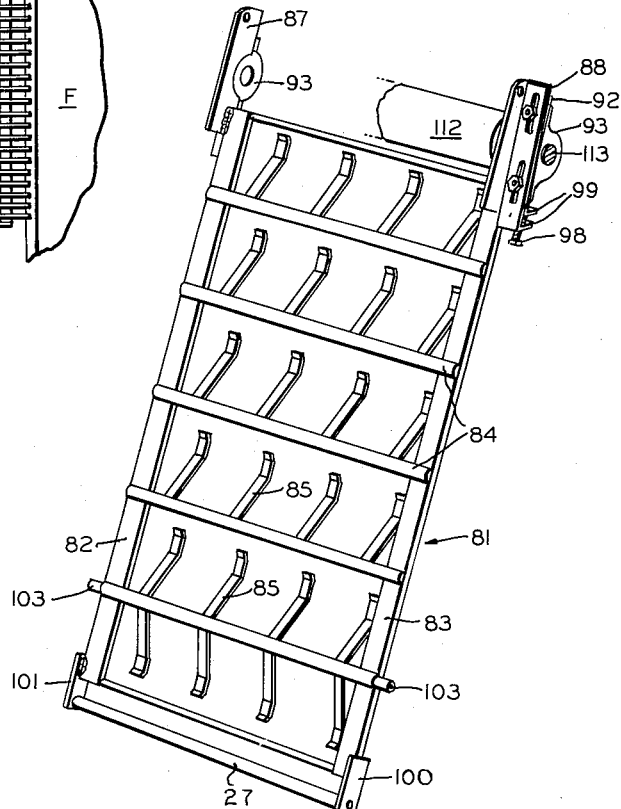
FIG_5
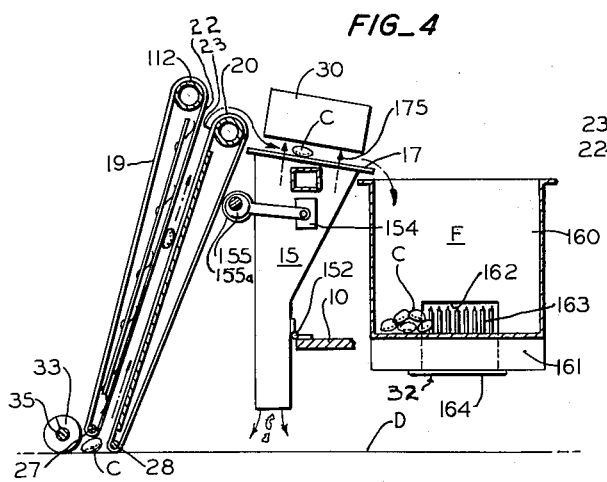
FIG_4
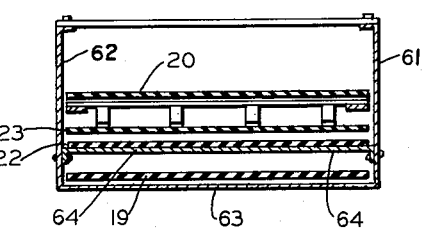
FIG_6
INVENTOR.
WALTER WIEBE
BY Hansen and Lane
ATTORNEYS 2,993,322
Patented July 25, 1961

2,993,322
FRUIT HARVESTER FOR PICKING UP FRUIT OFF THE GROUND
Walter Wiebe, 1131 San Felipe Road, Hollister, Calif.
Filed Aug. 27, 1959, Ser. No. 836,390
5 Claims. (Cl. 56—328)

The present invention relates to a nut and fruit harvester, and pertains more particularly to such a harvester wherein the fruit is picked up and elevated between adjacent parallel belts.

In the past, numerous attempts have been made to develop a nut and prune harvester which would satisfactorily pick up most of the nuts and fruit, such as prunes, falling from the trees and lying on the ground. The need for a suitable harvester of this kind has been increasingly noted in recent years, where constantly rising labor costs, and the frequent lack of a sufficient number of capable workers, has made the harvesting of nut and prune crops increasingly difficult and expensive.

While the present invention is designed particularly for use in picking up prunes and nuts, it obviously is capable of picking up other things also, so in order to avoid repetition and uncertainty the term "fruit" as used throughout the present specification and claims is intended to mean "nuts and fruit for which the present machine is suitable."

The present invention contemplates the provision of an improved fruit harvester adapted to pick up fruit from a fairly level ground surface, elevate the fruit, clean it of dirt and debris and deposit it in a container.

The invention also provides a fruit harvester riding on larger rollers so as to support the machine with a low unit ground pressure, thereby allowing it to operate on soft ground without sinking in, and also providing a smoothly rolled ground surface to facilitate a subsequent picking of fruit therefrom. The machine has a pair of adjustable fruit pickup belts mounted at its forward end adapted to ride closely adjacent the ground and to pick up fruit lying on the ground by nipping it between the two pickup belts, and then to elevate the fruit thus seized between the belts while maintaining a uniform pressure thereon, and then to discharge the fruit over the upper end of one of the belts onto a vibrating grating having a rising column of air directed upwardly therethrough, whereby heavier dirt and debris is screened out of the fruit, and lighter waste matter is blown upwardly clear of the fruit, the fruit itself gravitating across the grating into a container positioned to receive it.

A further object of the invention is to make an improved nut and fruit harvester.

These, and other objects and advantages of the invention, will be apparent from the following description and the accompanying drawings wherein:

FIG. 1 is an elevational view of the left hand side of a nut and fruit harvester embodying the present invention.

FIG. 2 is a right hand front quarter elevational view of the machine shown in FIG. 1, portions thereof being broken away.

FIG. 3 is a left hand front quarter elevational view of the same machine, portions thereof being broken away and shown in section.

FIG. 4 is a diagrammatic view showing the operation of the various parts of the machine of FIGS. 1–3.

FIG. 5 is a perspective view of the front pick-up belt frame as it appears when removed from the machine.

FIG. 6 is a sectional view taken along line 6—6 of FIG. 1.

FIG. 7 is a sectional view taken along line 7—7 of FIG. 1.

Briefly, in the illustrated embodiment of the invention, a fruit pickup machine A comprises a frame 10 mounted on a pair of light weight support rollers 11 and 12, the rear one 12 of which is steerable. The machine A is powered by two internal combustion engines 13 and 14. The larger engine 13 has clutch controlled driving connection with the forward roller 11, and also with a front-mounted fruit pickup belt assembly B, and an oscillating debris chute 15, with a fruit supporting grating 17 (FIG. 7) thereon. The smaller second engine 14 is directly coupled to a blower 18 which discharges an air current upwardly through the grating 17 for blowing out leaves and other light litter.

The belt assembly B comprises a forward fruit pickup belt 19, and a rear fruit pickup belt 20, both of which are mounted in a frame 21 with the rear run 22 of the forward belt 19, and the forward run 23 of the rear belt 20 adjustably spaced apart by a distance which is slightly less than the minimum diameter of the fruit C (FIG. 4) to be picked up from the ground D and carried upwardly between the belts. The entire pickup belt assembly B is vertically adjustable by an operator E through a manually actuated rack 24 and pinion 25.

The lower rollers 27 and 28 of the pickup belts 19 and 20, respectively, are of sufficiently small diameter to nip the fruit between the pickup belts and carry it upwardly. As the fruit C reaches the top of the rear pickup belt 20 it is carried over the head roller 29 of the latter belt and is discharged onto the oscillating grating 17, which slopes rearwardly toward a fruit collecting box or container F.

A hood 30 mounted over the grating 17 diverts the air current from the blower 18 laterally so as to direct the litter carried by such current away from an operator E standing on the rear step 31 of the machine. Any small rocks, chunks of dirt, or other heavy debris, smaller than the fruit C on the grating 17, drop down through the grating, pass through the open chute 15 and fall back onto the ground D. The fruit C gravitates across the grating 17 into the container F, from which it may be released by opening a spring closing gate 32 (FIGS. 2 and 4). A pair of helical flights 33 and 34 of opposite pitch are mounted on a rotating shaft 35 to sweep any fruit within their reach inwardly toward the lower end of the belt assembly B.

Referring to the drawings in greater detail, the vehicle frame 10 may be of suitable construction, such as of conventional welded steel plate, with a bolster 37 secured transversely of its forward end, and a pair of side plates 38 and 39 extending downwardly and forwardly from the outer ends of the bloster. The forward support roller 11 is fixedly secured to a driven axle 40, which is journaled in the lower ends of the side plates 38 and 39. The rear roller 12 is similarly journaled between a pair of side plates 41 and 42, secured to extend downwardly from the ends of a steerable rear bolster 43. The latter is swiveled beneath the frame 10, and a steering sprocket 44 (FIG. 1) is secured co-axially thereto.

The steering sprocket 44 is connected by a drive chain 45 to a smaller sprocket 47, which is secured to the lower end of a steereing shaft (not shown) journaled within an upright steering post 48, which is fixedly mounted on the frame 10. A steering wheel 49 is connected to the upper end of such steering shaft, so that rotation of the steering wheel 49 steers the roller 12 by means of the sprockets 44 and 47 and chain 45. A step 31 is provided at the rear end of the machine for an operator E to stand on while operating the machine. The larger, rear engine 13 has releasable driving connection, through a conventional clutch 51, with a jack shaft 52, which is journaled in bearings 53 (FIG. 2) mounted on the upright rear legs 54 of triangular standards 55 secured in alignment transversely of the top of the vehicle frame 10. A double grooved pulley 57 is secured to a clutch driven shaft 58, and a larger diameter, double grooved pulley 59, best shown in FIG. 3, is secured to the jack shaft 52. A pair of V-belts 60, passing around these two pulleys, transmit the driving power of the rear engine 13, under control of the clutch 51, to the jack shaft 52.

The fruit pickup belt assembly B comprises the channel frame 21 (see FIG. 6) mounted in slightly rearwardly inclined position on the forward end of the vehicle frame 10. As best shown in FIG. 6, the fruit pickup belt assembly frame 21 is of sheet steel of suitable strength, for example, No. 20 U.S. Standard gauge. This frame 21 is in the form of a forwardly open channel, with side panels 61 and 62, and transverse rear panel 63. A transverse bracing and rear belt support plate 64, also of sheet metal, is secured transversely of the channel shaped belt frame 21, as best shown in FIG. 6, in position to have slidable, supporting contact with the rear or inner face of the forward run 23 (FIGS. 3, 4 and 6) of the rear pickup belt 20.

A pair of elongated guide bushings 67 and 68 are fixedly secured, one lengthwise of each rearward corner of the belt frame 21. These bushings are fitted for axial slidable movement onto a pair of track rods 69 and 70, which are fixedly secured, in forwardly spaced, parallel relation, to the sloping forward legs of two of the triangular frame standards 55 (FIGS. 1 and 2). Each of the guide bushings 67 and 68 has one of the racks 24 fixedly secured lengthwise of its rearward side, and these racks are in toothed, driven engagement with the pinions 25 fixedly secured to a shaft 71 journaled in bearings 72 on the inclined forward legs of the triangular standards 55. It will be noted that the forward legs of all three triangular standards 55 are parallel to the slope of the pickup belt frame 21.

The pinion shaft 71 has a sprocket 73 (FIG. 1) on its left hand end, and a chain 74, passing around this sprocket and also around a sprocket 75 secured co-axially to a hand wheel 77 mounted to be within reach of an operator E, permits such operator to raise and lower the fruit pickup belt assembly B as required. A pawl 78 (FIG. 1) is urged by a spring 79 toward latching engagement with the hand wheel sprocket 75, thereby to support the belt frame B against accidental downward displacement. A pawl release handle 80 is connected to the pawl 78 for disengaging the latter from the sprocket 75 when it is desired to lower the pickup belt assembly B.

The forward fruit pickup belt 19 is mounted in the channel frame 21 on a separate swinging frame 81, shown in detail in FIG. 5. This forward belt frame 81 comprises a pair of parallel side bars 82 and 83, which may be of steel, and a plurality of transverse spring mounting bars 84 extending transversely therebetween. A plurality of belt presser spring fingers 85 are mounted on each of the transverse bars 84 and bear against the rear run 22 of the forward belt 19, urging said rear run belt toward the forward run 23 of the rear pickup belt 20.

A pair of angle members 87 and 88, each having a pair of slotted holes therein, are mounted one at the upper end of each belt frame side bar 82 and 83, respectively. These angle members are pivotally connected, by pivot bolts 89, one to each of a pair of upwardly extending arms 90 and 91, secured one to the upper end of each pickup belt frame side panel 61 and 62 of the pickup belt assembly frame 21.

A bearing adjusting plate 92 is mounted in contact with the rear face of each of the angle members 87 and 88, and a bearing 93 is mounted on the rear face of each adjusting plate 92. A pair of securing bolts 94 are inserted through slotted holes 95 in each angle member 87 and 88, and also through aligned holes, not shown, in each bearing adjusting plate 92, and in the bearing 93 associated therewith. An adjusting screw 97 is screwed upwardly into a threaded hole provided therefor in an angularly bent lower end portion 98 of each angle member 87 and 88, and the upper end of each screw 97 bears against a similar angularly bent lower end portion 99 of the bearing adjusting plate 92 associated therewith.

Upon loosening the securing bolts 94, the bearings 93 may be adjusted upwardly or downwardly as required, by turning the machine screws 97 in a required direction, after which the bolts 94 may be re-tightened to hold the bearings in such adjusted position. This same general type of adjustment is used at several other points throughout the machine A, as will be apparent from the drawings, and the foregoing explanation will apply to these other, similar adjustments.

The small diameter lower belt roller 27 of the forward pickup belt 19 is journaled for free rotation in a pair of downwardly extending side plates 100 and 101 (FIG. 5), which are secured to the lower ends of the forward belt frame side bars 82 and 83, respectively.

Pivotal adjustment of the forward pickup belt 19 about the pivot bolts 89 at its upper end is accomplished by a pair of slotted metal links 102, connected one to each of a pair of side bosses 103 (FIG. 5) near the lower end of the forward belt frame 81, which bosses project through openings 104 provided therefor in the channel frame side panels 61 and 62. A machine screw 105, having its shank inserted in the slotted link 102 associated therewith, is screwed into a nut, not shown, welded to the side panel 61 or 62, as the case may be, to position the lower end of the forward belt frame 81, and the belt 19 thereon, in selected, spaced relation to the rear pickup belt 20.

The fruit pickup belts 19 and 20 are preferably of softly resilient material, such as a foam rubber type of belting which is well known in the fruit processing industry. Both pickup belts 19 and 20 are provided with releasable, hinged or flexible lacings 108 (FIG. 3), for example, a lacing having a plurality of endwise extending loops 109 and 110 extending transversely across the two ends of the belt to be joined. The loops 109 and 110 on the two belt ends are relatively interposed, and are hingedly connected together by a pin 111, inserted through the two sets of interposed loops. Since several suitable lacings are well known in the art, and since they are not a feature of the present invention, it will be unnecessary to describe them in further detail herein.

The rear pickup belt 20 passes over its driven head roller 29, and around the under side of the lower, small diameter roller 28, which is of minimum practical diameter so as to engage fruit C (FIG. 4) lying on the ground, and urge such fruit upwardly for nipping between the two pickup belts to initiate its upwardly travel between these belts.

The shaft 35, having the helical flights 33 and 34 of opposite pitch mounted on opposite ends thereof, is journaled in bearings 115 provided therefor on the lower ends of the belt frame side panels 61 and 62. This flight shaft 35 is driven by a V-belt 117 passing around a grooved pulley 118 on the shaft 35, and also around a larger grooved pulley 119 mounted on a shaft 120 which is journaled in bearings 121, mounted on angle iron reinforcing members 122 secured by brackets 123 along the forward edges of the belt frame side panels 61 and 62.

The fruit pickup belts 19 and 20, and the shaft 120 for driving the helical flights 33 and 34, are driven by a single drive chain 124, which is passed around a sprocket 125 on the jack shaft 52. This chain 124 also is passed around a sprocket 127 on the shaft 120, over a sprocket 128 on the shaft 113 of the head roller 112 of the forward fruit pickup belt 19, then around the underside of a sprocket 131 on the shaft 132 of the head roller 29 of the rear fruit pickup belt 20, thereby reversing the directions of rotation of the two fruit pickup belts 19 and 20, then around an idler sprocket 133 which carries the chain 124 well around the sprocket 131 of the rear fruit pickup belt head roller 29, then around a tensioning idler sprocket 134, and thence back to the jack shaft sprocket 125.

The tensioning sprocket 134 is mounted for free rotation on the free end of an arm 135 the other end of which arm is pivotally connected at 137 to the belt frame side panel 62. A coil spring 138 is connected in tension between the pivoted arm 135 and a slotted link 139. A screw 140, having its shank inserted in the slotted link 139, is screwed into a nut 141 welded onto the angle member 122 on the belt frame left side panel 62. By loosening the screw 140 the link 139 may be adjusted longitudinally thereof to increase or decrease the tension of the spring 138 as required, after which the screw 140 may again be tightened to secure the link 139 in such adjusted position.

The jack shaft 52, as will be noted in FIG. 2, extends transversely through the machine A. A sprocket 142 on the projecting right hand end of the jack shaft 52 drives the forward vehicle support roller 11 by a chain 143 passing around the jack shaft sprocket 142, and also around a sprocket 144 secured co-axially to the front roller axle 40, to which the front roller 11 is also secured.

A sprocket 147 is also mounted on the jack shaft 52, and a chain 148 passes around this sprocket 147, beneath an idler sprocket 149, and over a sprocket 150 on a vibrator shaft 151 for vibrating the debris chute 15 and the grating 17 (FIG. 7) thereon.

The debris chute 15 is of truncated, inverted, pyramidal shape, and is pivotally mounted at 152 (FIG. 4) near its lower end on the vehicle frame 10. A pair of identical oscillating connecting rods 153 are pivotally connected to brackets 154, secured one to each side of the debris chute 15 near its upper end, for vibrating the chute when the machine A is in motion. A pair of eccentrics 155 are secured to the vibrator shaft 151, and a bearing 155a on the other end of each connecting rod 153 from that connected to the chute bracket 154 is journaled on each of these eccentrics. Rotation of the vibrator shaft 151 thus oscillates the connecting rods 153 and vibrates the chute 15 and the grating 17 thereon.

The grating 17 which covers the upper end of the debris chute 15 has connected thereto a pair of side plates 157, one along each side of the grating 17, and extending down alongside the upper end of the debris chute 15. Each side plate is pivotally connected at its forward end to the chute 15, and has an arcuate slotted opening 158 therein to receive a screw 159, which is screwed into a nut, not shown, welded one to each side of the chute 15. These screws 159, when released, free the side plates 157, and the grating 17 secured thereto, for fore-and-aft tilting adjustment, and when retightened, secure these parts in adjusted position.

The fruit receiving container F is mounted on the vehicle frame 10, and, as illustrated, comprises a box 160 having the bottom 161 thereof sloping toward a discharge opening 162 in the side of the container. The retaining gate 32 comprises a plurality of upright rods 163, secured at their lower ends to the lower cross bar 164 of a rectangular frame 165 of bent steel rod. The retaining rods 163 are inserted for sliding movement through a row of holes provided therefor across the lower side of the discharge opening 162. The gate 32 is urged upwardly to fruit retaining condition as shown in solid lines in FIG. 2 by a coil spring 167, which is held in tension between an arm 168 on the upper end of the gate frame 165 and the upper edge of the container F. The contents of the container F may be discharged by manually depressing the gate 32 to its broken line position shown in FIG. 2, whereupon the contents of the container gravitate through the discharge opening 162. If desired, the container F may be removed, and an ordinary field box may be mounted in its place to receive the fruit as is discharged from the rear edge of the shaker grating 17.

The debris deflecting hood 30 is of sheet metal, and is fixedly secured to the pickup belt frame 21 by brackets 169 (FIG. 2) and 170 (FIG. 1).

The blower 18 has the impeller 171 thereof coupled in a conventional manner in direct, driven relation with the small engine 14, mounted on a lateral extension 172 (FIG. 3) of the vehicle frame 10. From the discharge end of the blower housing 173 (FIG. 3) a flexible tube 174 openly communicates the discharge outlet of the blower 18 with the interior of the debris chute 15. Operation of the blower thus creates an upward air current through the grating 17, the velocity of which current may be controlled by varying the speed of the small engine 14. This air current, indicated by the arrows 175 in FIG. 4, blows out any twigs, leaves and other light litter which may be carried up with the fruit and discharged onto the grating 17. This lighter litter is deflected laterally away from the operator E by the hood 30, while the heavier debris gravitates through the grating 17 and the open chute 15 back onto the ground D.

In using the illustrated machine A, the rear fruit pickup belt 20 is adjusted for proper belt tension, and also to bring the lower end of the rear belt 20 a slight distance below the lower end of the forward belt 19, by adjusting screws 177 and 178, which operate on the shaft bearings for the rollers 18 and 19 of the rear pickup belt 20 similarly to the adjusting screw 97 for the head roller bearings 92 of the forward pickup belt 19, as described previously herein.

The difference between the height of the lower ends of the two fruit pickup belts from the ground should be approximately the diameter of the fruit to be collected. Also, the rear belt 20 should be at ground level when the conveyor flights 23 and 24 are just touching the ground D, so that said flights will sweep fruit on the ground on each side of the belt frame assembly B inwardly toward the pickup belts. The forward pickup belt 19 then may be adjusted for tautness of the adjusting screws 97, and for height by adjusting screws 180 acting on the front pickup belt frame support arms 90 and 91, whereupon the machine A is ready for use.

When driving to and from an orchard where fruit is to be collected, an operator E elevates the pickup belt assembly B well clear of the ground D by means of the hand wheel 77, the spring pressed pawl 78 holding the assembly B in such elevated condition. When ready to begin picking, the pawl 78 is released, and the belt assembly B is lowered by means of the hand wheel 77 until the lower end of the rear pickup belt 20 just barely clears the ground. With both engines 13 and 14 running, the operator then engages the clutch 51 by means of a usual clutch lever 179 (FIG. 1) and drives the machine along the ground where the fruit lies, guiding the machine by means of the steering wheel 49.

The large supporting rollers 11 and 12 distribute the weight of the machine over a large ground area, with a resultant low unit ground pressure, so that the machine does not tend to sink into the relatively soft orchard ground, thereby maintaining the pickup belts 19 and 20 at a proper adjusted height relative to the ground and leaving the ground rolled smooth for subsequent pickings.

The pickup belts 19 and 20, with their head rollers 112 and 29 rotating in opposite directions as explained previously herein, nip the fruit C lying on the ground and pick it up between them, carrying it upwardly between the two belt runs 22 and 23 and discharging it over the rear belt head roller 29 onto the vibrating grating 17.

The spacing between the lower ends of the fruit pickup belts 19 and 20 may be adjusted to accommodate the fruit being picked by loosening the screws 105 to free the slotted links 102, moving the lower end of the forward belt frame 81 forwardly or rearwardly as required to increase or decrease the desired spacing between the lower ends of the pickup belts 19 and 20, and again tightening the screws 105 to secure the links 102, and thereby the forward belt frame 81, in adjusted position.

The smaller, heavier debris falls through the grating 17 and is returned onto the ground D through the open lower end of the debris chute 15, while the lighter litter is blown upwardly clear of the grating and laterally out of the hood 30 by the air current from the blower 18. The fruit C gravitates across the vibrating grating 17 and drops into the container F.

The speed of travel of the fruit C across the grating 17 may be increased or decreased by changing the angle of tilt of the grating 17. This is accomplished, as explained previously herein, by loosening the screws 159 to free the grating side plates 157, swinging the rear end of the grating 17 upwardly or downwardly to a desired angle of tilt, and retightening the screws 159 to secure the grating in adjusted condition. When the container F is filled to a desired degree, the fruit may be discharged therefrom by lowering the gate 32 to its broken line position of FIG. 2, thereby clearing the discharge opening 162 and allowing the fruit to gravitate therethrough.

The invention provides a simple, sturdy and effective fruit picker, and one which recovers a high percentage of the nut and fruit crop lying on the ground, providing the ground is properly smoothed and prepared, which is, of course, a necessary prerequisite for the practicing of the present invention. This is not a problem, however, since most orchards which bear fruit of the types for which the present invention is intended, for example, prunes and walnuts, have the ground thereof smooth and clean at harvest time in any event.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. A fruit harvester for picking up fruit lying on the ground comprising a vehicle supported on front and rear light weight cylindrical support rollers of substantial length, means for steering one of said support rollers, power drive means mounted to propel one of said support rollers, a pickup belt frame mounted for vertical adjustment on said vehicle, a forward and a rearward small diameter lower belt roller journaled transversely in the lower end of the belt frame, a forward and a rearward larger diameter upper belt roller journaled transversely in the belt frame and spaced upwardly from said lower belt rollers, all of said belt rollers being in axially parallel relation, a forward and a rearward fruit pickup belt each passed around one lower belt roller and a corresponding upper belt roller, said forward and rearward belt rollers being located to position adjacent runs of said belts between their respective upper and lower belt rollers substantially parallel and spaced apart by a distance slightly less than the diameter of fruit to be harvested, power drive means for driving the two belts in opposite rotative directions and with their adjacent runs moving upwardly, the two lower belt rollers being relatively positioned in the belt frame to position the bottom of the forward belt higher than the bottom of the rearward belt by a distance approximating the diameter of such fruit, means for vertically adjusting the entire belt frame with the belt rollers and belts thereon to position the bottom of the rearward belt closely adjacent ground over which the vehicle is propelled, the diameter of the rearmost lower belt roller and the thickness of the rear belt thereon being such as to provide a radius of belt curvature around the lower belt roller approximating the radius of a fruit to be harvested by said harvester.

2. A fruit harvester for picking up fruit lying on the ground comprising a vehicle, a generally upright pickup belt frame mounted for vertical adjustment on said vehicle, a forward and a rearward small diameter lower belt roller journaled transversely in the lower end of the belt frame, a forward and a rearward larger diameter upper belt roller journaled transversely in an upper porton of the belt frame all of said belt rollers being in axially parallel relation, a forward and a rearward fruit pickup belt each passed around one lower belt roller and a corresponding upper belt roller, said forward and rearward belt rollers being located to position adjacent runs of said belts substantially parallel and spaced apart by a distance slightly less than the diameter of fruit to be harvested, power drive means for driving the two belts in opposite rotative directions and with adjacent runs thereof moving upwardly, the lower belt rollers being relatively positioned in the belt frame to position the bottom of the forward belt higher than the bottom of the rearward belt by a distance approximating the diameter of such fruit, means for vertically adjusting the entire belt frame with the belt rollers and belts thereon to position the bottom of the rearward belt closely adjacent ground over which the vehicle is moved, the diameter of the rearmost lower belt roller and the thickness of the rear belt thereon being such as to provide a radius of belt curvature around the lower belt roller approximating the radius of a fruit to be harvested by said harvester.

3. An arrangement according to claim 2 wherein the entire belt frame is tilted rearwardly sufficiently to tilt the parallel adjacent runs of the belts rearwardly.

4. A fruit harvester for picking up fruit lying on the ground comprising a vehicle, a pickup belt frame mounted for vertical adjustment on said vehicle, a forward and a rearward small diameter lower belt roller journaled transversely in the lower end of the belt frame, a forward and a rearward larger diameter upper belt roller journaled transversely in the belt frame and spaced upwardly from said lower belt rollers, all of said belt rollers being in axially parallel relation, a forward and a rearward fruit pickup belt each passed around one lower belt roller and a corresponding upper belt roller, said forward and rearward belt rollers being located to position adjacent runs of said belts between their respective upper and lower rollers substantially parallel and spaced apart by a distance slightly less than the diameter of fruit to be harvested, a flat plate mounted in supporting relation with an adjacent run of one belt, spring presser means mounted in supporting relation with an adjacent run of the other belt, power drive means for driving the two belts in opposite rotative directions and with adjacent runs thereof moving upwardly, the lower belt rollers being relatively positioned in the belt frame to position the bottom of the forward belt higher than the bottom of the rearward belt by a distance approximating the diameter of such fruit, means for vertically adjusting the entire belt frame with the belt rollers and belts thereon to position the bottom of the rearward belt closely adjacent ground over which the vehicle is moved, the diameter of the rearmost lower belt roller and the thickness of the rear belt thereon being such as to provide a radius of belt curvature around the lower belt roller approximating the radius of a fruit to be harvested by said harvester.

5. A fruit harvester for picking up fruit lying on the ground comprising a vehicle, a generally upright pickup belt main frame mounted for vertical adjustment on said vehicle, a separate frame for one belt pivotally mounted at the upper end of the pickup belt main frame and extending lengthwise thereof, a small diameter lower belt roller and a larger diameter upper belt roller journaled transversely in the belt main frame, a small diameter lower belt roller and a larger diameter upper belt roller journaled transversely in the separate, pivoted belt frame, all of said belt rollers being in axially parallel relation, a forward and a rearward fruit pickup belt each passed around one lower belt roller and a corresponding upper belt roller, said belt rollers being located to position adjacent runs of said belts substantially parallel and spaced apart by a distance slightly less than the diameter of fruit to be harvested, means for pivotally adjusting the separate pivoted belt frame to adjust the clearance between the lower end portions of said belts, power drive means for driving the two belts in opposite rotative directions and with adjacent runs thereof moving upwardly, the lower belt rollers being relatively positioned to position the bottom of the forward belt higher than the bottom of the rearward belt by a distance approximating the diameter of such fruit, means for vertically adjusting the belt main frame with the belt rollers and belts thereon to position the bottom of the rearward belt closely adjacent ground over which the vehicle is moved, the diameter of the rearmost lower belt roller and the thickness of the rear belt thereon being such as to produce a radius of belt curvature around the latter lower belt roller approximating the radius of a fruit to be harvested by said harvester.

References Cited in the file of this patent
UNITED STATES PATENTS

| | | |
|---|---|---|
| 2,402,201 | Martin | June 18, 1946 |
| 2,901,879 | Jones | Sept. 1, 1959 |